| United States Patent [19] | [11] Patent Number: 4,493,928 |
|---|---|
| Koshugi | [45] Date of Patent: Jan. 15, 1985 |

[54] CROSSLINKED CHITIN DERIVATIVES

[75] Inventor: Junichi Koshugi, Tokyo, Japan

[73] Assignee: Kureha Kagaku Kogyo Kabushiki Kaisha, Nihonbashi, Japan

[21] Appl. No.: 390,832

[22] Filed: Jun. 22, 1982

Related U.S. Application Data

[62] Division of Ser. No. 132,787, Mar. 24, 1980, Pat. No. 4,373,096.

[30] Foreign Application Priority Data

Apr. 6, 1979 [JP] Japan .................................. 54-41812

[51] Int. Cl.$^3$ ............................................ C08B 37/08
[52] U.S. Cl. ................................. 536/20; 260/112 R
[58] Field of Search ....................... 536/20; 260/112 R

[56] References Cited

U.S. PATENT DOCUMENTS

| 2,168,375 | 8/1939 | Thor | 536/20 |
| 3,251,824 | 5/1966 | Battista | 536/20 |
| 4,027,068 | 5/1977 | Saad | 536/20 |
| 4,076,930 | 2/1978 | Ellingboe et al. | 536/20 |
| 4,119,619 | 10/1978 | Rogozhin et al. | 536/20 |
| 4,308,377 | 12/1981 | Koshugi et al. | 536/20 |

FOREIGN PATENT DOCUMENTS

858696  12/1952  Fed. Rep. of Germany ........ 536/20

*Primary Examiner*—Johnnie R. Brown
*Attorney, Agent, or Firm*—Wegner & Bretschneider

[57] ABSTRACT

A novel crosslinked polymeric substance and a process for preparing the novel crosslinked polymeric substance are disclosed, the novel crosslinked polymeric substance being prepared from natural chitin or regenerated chitin and the polymeric substance having an amphoteric capability.

4 Claims, No Drawings

CROSSLINKED CHITIN DERIVATIVES

This application is a division of Ser. No. 132,787 filed Mar. 24, 1980, now U.S. Pat. No. 4,373,096.

BACKGROUND AND DETAILED DESCRIPTION OF THE PRESENT INVENTION

The present invention relates to a novel crosslinked polymeric substance having an amphoteric capability and furthermore relates to a process for preparing the novel crosslinked polymeric substance from natural chitin or regenerated chitin.

Fiberformes occurring in nature are divided broadly into collagen in higher animals, chitin in arthropods and in lower plants and cellulose in higher plants, and the frames of the living things are made by the sedimentation of apatite, calcium carbonate and lignin onto the above-mentioned fiberformes, respectively. Among them, chitin is a mucopolysaccharide of poly-N-acetyl-D-glucosamine, and its amount in nature is comparable favorably with the amount of cellulose in nature. However, since chitin is a highly crystalline substance and the intermolecular bonding thereof through the acetylamino groups is extremely stable, it is very much difficult to find an appropriate solvent to dissolve, disperse or swell chitin favorably. Accordingly, the development pertaining to the utilization of the chitin resources is far behind of that of cellulose and other polysaccharides.

The inventor of the present invention has formerly offered a method for preparing a water-soluble chitin-derivative (Japanese Patent Application No. Shou 53-161391/78) and a shaped material which makes most of the specific property of the water-soluble chitin (Japanese Patent Application No. Shou 53-161389/78). Particularly, the Japanese Patent Application No. Shou 53-161388/78 discloses a method by which variously shaped material having amphoteric ion-exchangeability has become available and contributes largely to the effective utilization of the chitin resource.

However, since in the outer surface of the above-mentioned shaped material, a larger part of amino groups have been acylated, the material is not amphoteric. Furthermore, since the membrane of the outer surface of the shaped material has a molecular sieve effect, it cannot allow the high-polymeric substance such as protein to permeate through the membrane into the inner part, and accordingly, there are cases where its amphoteric ion-exchangeability or its adsorbing capability are not sufficiently exhibited.

The inventor of the present invention, after studying earnestly, has developed a novel polymeric substance insoluble in aqueous solutions of acid, alkali and neutral salt, respectively, having carboxylic group(s) which may become anion and amino group(s) which may become cation, and a process for preparing of the novel polymeric substance and has been lead to the present invention.

The crosslinked polymeric substance of the present invention is synthesized from natural chitin or regenerated chitin as the raw material. The thus obtained crosslinked polymeric substance has (a) a degree of crosslinking of 0.01 to 0.3, (b) a degree of substitution of carboxylic group of 0.1 to 0.9 and (c) a degree of deacetylation of 0.1 to 1.

The following is the detailed description of the process for preparing the crosslinked polymeric substance according to the present invention.

Chitin used as the raw material of the present invention is the product obtained by a publicly known method from natural substances containing chitin represented by the following formula (I):

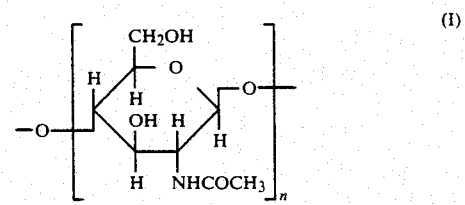

After crushing chitin, it is immersed into an aqueous alkaline solution of a normality of 10 to 15. The alkali used in the present invention is sodium hydroxide, potassium hydroxide or lithium hydroxide. The amount of the aqueous alkali solution is 3 to 5 times by weight of the amount of chitin, and the temperature of the aqueous solution is lower than room temperature, preferably of 5° to 20° C.

Then, in order to make the crosslinking of chitin easier, the excess alkali solution is removed from the immersed chitin, or the immersed chitin is subjected to freezing. Particularly, the freeze-treatment of the immersed chitin opens preferably the chitin micells, and is able to keep the alkali in the intricated parts of the micells, and accordingly, the treatment acts advantageously in the reaction of crosslinking.

In the freezing step, the mixture of chitin and the alkali is frozen at a temperature of −3° to −30° C., preferably of −10° to −20° C. for a preferable time of 3 to 24 hours. The degree of swelling the micells of chitin is determined by taking up a small amount of the specimen and dissolving it into a small amount of an iced water to see the uniformity of the thus obtained solution, because in the case of fully swelled micells, the solution is uniform with dispersed chitin.

In addition, in the cases where the amount of alkali is out of the above-mentioned range, the micells are only partially opened giving a non-uniform and opaque solution. The reason is considered that in cases of smaller amount of alkali solution, it cannot permeate into the interior of the chitin particles, and on the other hand, in cases of larger amount of alkali solution, it presents on the surface of the particle of chitin in plenty and only the surface is frozen in the freezing treatment. As a result, the interior swelling of the particles of chitin is suppressed not to open fully. In cases where the concentration of alkali is too small, chitin does not swell when immersed into such an alkali solution.

The crosslinking is carried out by admixing a crosslinking agent in an amount of 0.1 to 3 times, preferably 0.5 to 2 times by molecular weight of the raw material, chitin, with the above-mentioned chitin from which the excess of the aqueous alkali solution has been removed or with the above-mentioned alkali-containing chitin after treatment of freezing, at a temperature of lower than room temperature, preferably lower than 0° C. for 5 to 48 hours.

The crosslinking agent is represented by the general formula:

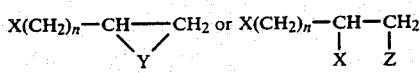

wherein X represents a halogen atom; Y represents an oxygen or a sulfur atom; Z represents a hydroxyl or a thiol group, and n is an integer of 1, 2 or 3.

An example of the crosslinking state of the crosslinked chitin obtained by the above-mentioned reaction is represented by the following general formula (II):

(II)

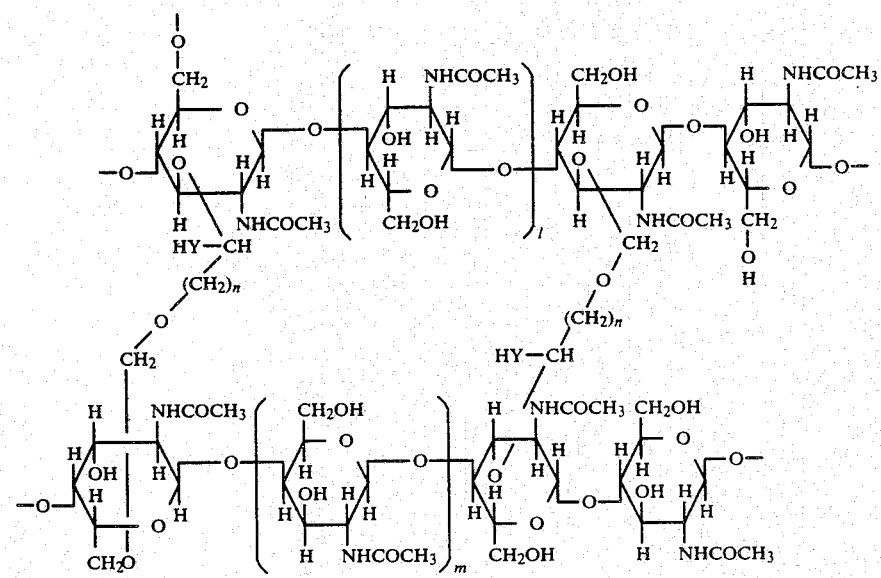

wherein l, m and n are an integer.

Other than the structure shown in the formula (II), the above-mentioned crosslinked chitin are crosslinked via the divalent group

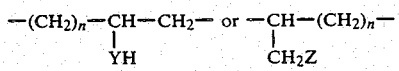

between the oxygen bonded to 6-position of carbon of N-acetyl-D-glucosamine and the oxygen bonded to 3-position of carbon of the glucosamine, between the oxygen atoms respectively bonded to 6-positions of carbon atoms of two N-acetyl-D-glucosamines, or between the oxygen atoms respectively bonded to 3-positions of carbon atoms of two N-acetyl-D-glucosamines.

As is clearly seen in the above-mentioned structural formula, the crosslinking is carried out, as in the carboxyalkylation which is described later, on OH group or on CH$_2$OH group of chitin. Accordingly, the degree of crosslinking is determined in relation to the degree of carboxyalkylation. The degree of crosslinking in the present invention is 0.01 to 0.3 per unit of N-acetyl-D-glucosamine. The term "degree of crosslinking" is the reacted amount of crosslinking agent obtained from the values of elementary analysis. As the crosslinking agent represented by the formula

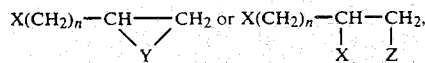

for instance, epichlorhydrin, 1-bromo-3,4-epoxybutane, 1-bromo-4,5-epoxypentane, 1-chloro-2,3-epithiopropane, 1-bromo-2,3-epithiopropane, 1-bromo-3,4-epithiobutane, 1-bromo-4,5-epithiopentane, 2,3-dibromopropanol, 2,4-dibromobutanol, 2,5-dibromopentanol, 2,3-dibromopropanethiol, 2,4-dibromobutanethiol, 2,5-dibromopentanethiol, etc. can be mentioned, however, epichlorhydrine, 2,3-dibromopropanol and 1-chloro-2,3-epithiopropane are preferable in use.

In the next place, the crosslinked carboxyalkylchitin is obtained by the following method:

The above-mentioned alkali-containing crosslinked chitin is dispersed into an organic solvent containing an etherifying agent and made to react at a temperature of 0° to 30° C. for one to 72 hours, preferably 5 to 12 hours. In this case, since there is an evolution of heat due to neutralization at first, it is preferable to keep the temperature at 0° to 10° C. and then at a predetermined temperature in the reaction. After the reaction is over, the organic solvent is removed and the residue is dispersed into water. The aqueous dispersion is neutralized, filtered, desalted and dried to obtain the crosslinked carboxyalkylchitin. In the present invention, as the organic solvent in carboxyalkylation, a solvent selected from methanol, ethanol, isopropyl alcohol, n-propanol, acetone and dimethylsulfoxide is used. The reason why such an organic solvent is used, is that in the process of the present invention, since the hydroxyl groups of chitin take a form of alcoholate by the action of alkali, there is an advantage of possibly carry out the carboxyalkylation of the alkali-containing chitin as it is.

The etherifying agent used in carboxyalkylation in the present invention is a compound represented by the general formula of X(CH$_2$)$_n$COOH, wherein X represents a chlorine or a bromine atom, and n is an integer of 1, 2 or 3, and is exemplified by chloroacetic acid, bromoacetic acid, beta-chloropropionic acid, beta-bromopropionic acid, gamma-chlorobutyric acid and gamma-bromobutyric acid.

The amount of the etherifying agent in the reaction is preferably one to three times by molecular weight of the raw material, chitin.

According to the process of the present invention, a water-insoluble derivative of chitin such as crosslinked carboxymethylchitin, crosslinked carboxyethylchitin and crosslinked carboxylpropylchitin is obtained. The degree of substitution with carboxyalkyl groups by the carboxyalkylation (hereinafter referred to as the degree of carboxyalkylating substitution) in the present invention can be determined at will by choosing the conditions, and it is generally 0.1 to 0.9, preferably 0.3 to 0.9. In addition, the degree of carboxyalkylating substitution, herein mentioned, is obtained from the elementary analytical data on the product and the titer of the salt-type chitin by an aqueous hydrochloric acid at the pK value of 4.3.

Furthermore, the crosslinked polymeric substance of the present invention comprising the de-acetylated product of carboxyalkylchitin is possibly obtained by de-acetylation of the above-mentioned crosslinked carboxyalkylchitin with an aqueous high-concentrated alkali solution, preferably an aqueous 4 to 15N alkali solution at a temperature of 65° to 150° C., preferably of 65° to 110° C. for 0.1 to 48 hours.

The above-mentioned crosslinked carboxyalkylchitin used as the starting material of de-acetylation may be the solvent-including product of the above-mentioned carboxyalkylation in an organic solvent obtained by filtering and washing with ethanol and acetone, the dried product or the product containing humidity.

During the reaction of de-acetylation, carboxyalkyl groups are not removed even when heated in the aqueous alkali solution because they are bonded by ether-linkage.

The degree of de-acetylation of the above-mentioned product of de-acetylation is obtained by the values of the elementary analysis of the product and is 0.1 to 1, preferably 0.3 to 1.

The properties of the crosslinked polymeric substance of the present invention obtained by the above-mentioned process have been confirmed by the elementary analysis, infrared spectroscopy, colour reactions, chemical analysis, tests for solubilities, etc. as follows:

(a) degree of crosslinking: 0.01 to 0.3;
(b) degree of carboxyalkylating substitution: 0.1 to 0.9;
(c) degree of de-acetylation: 0.1 to 1;
(d) nitrogen content: 5.3 to 8.3% by weight;
(e) infrared absorption bands: 1680 to 1720 cm$^{-1}$ and 1500 to 1530 cm$^{-1}$;
(f) colour reaction: showing purple colour in reaction with iodine in the presence of sulfuric acid; and
(g) solubility: insoluble in aqueous acid solutions, aqueous alkali solutions and aqueous salt solutions.

That is, in the infrared absorption spectrum of the object product of the present invention, an absorption band of 1680 to 1720 cm$^{-1}$ corresponding to carboxyl group and an absorption band of 1500 to 1530 cm$^{-1}$ corresponding to NH$_2$ group are recognized and a purple colour is exhibited when the object product is made to react with iodine in the presence of sulfuric acid as a proof of a de-acetylated product. And the fact that the object product is crosslinked substance is verified by its insolubility in respective aqueous solution of acid, alkali and salts.

Moreover, the molecular weight of the crosslinked polymer having amphoteric ion-exchangeability, which the present invention offers, is not yet accurately determinable because there are no suitable solvents which are able to dissolve the polymer as it is (that is, without decomposition), as the raw material of the polymer, chitin, (because of the chemical stability of chitin, there are no solvents which are able to dissolve chitin as it is) although there are reports informing that the molecular weight of chitin is from a few hundred thousands to a few millions.

The crosslinked polymeric substance according to the present invention has, as will be seen in Examples, amphoteric ion-exchangeability and is chemically stable too, and accordingly it is effectively used as a filler of the column for the separation of sugar-protein, the separation of protein-protein, the de-salting of raw sugar, and as a dialyzing material, and an adsorbent of affinity chromatography.

The followings are the more detailed explanation of the present invention while referring to Examples:

EXAMPLE 1

(1-1) Preparation of crosslinked carboxymethylchitin

After mixing and kneading 20 g of natural chitin with 80 g of an aqueous 11N sodium hydroxide solution at a temperature of 15° C., the kneaded mixture was frozen at a temperature of −20° C. for 24 hours.

Then, the frozen material was dispersed into a solution of 20 g of epichlorhydrin in 200 ml of isopropyl alcohol and the dispersion was left at a temperature of 0° for 24 hours during which time a crosslinking took place. From the elementary analytical values of a small specimen of the thus obtained crosslinked product, it was informed that the degree of crosslinking of the product was 0.1. A solution of 30 g of chloroacetic acid in 200 ml of isopropyl alcohol was slowly added to the above-mentioned dispersion of crosslinked chitin, and after 2 hours of reaction at a temperature of 0° C., the mixture was warmed to a temperature of 20° C. and kept at the same temperature for 40 hours under agitation during which time a reaction took place.

After the reaction was over, the solid matter in the above-mentioned dispersion was separated by filtration and was re-dispersed into one liter of water. The solid matter was hardly soluble in water. After neutralizing the dispersion, the neutralizate was filtered, washed with water and de-salted to obtain an elastic gel. After washing the gel with ethanol, 28 g of white powder were obtained by drying the washed gel under reduced pressure. This white powder gives the infrared absorption peaks of 1680, 1500, 1210 and 1190 cm$^{-1}$ and accordingly it was confirmed that the powder has been carboxymethylated. The degree of substitution with carboxymethyl group was 0.7 according to the values of its elementary analysis.

On immersing one gram of this white powder into 500 g of an aqueous 5% by weight of sodium hydroxide solution, nothing was dissolved into the aqueous sodium hydroxide solution from the powder. In addition, the cation exchange capacity of the white powder was 3.35 meq./g.

From the above-mentioned results, it was confirmed that the white powdery product was crosslinked carboxymethylchitin.

(1-2) Preparation of the novel crosslinked polymeric substance

Ten grams of the above-mentioned white powdery carboxymethylchitin were treated in 100 g of an aqueous 12.5N sodium hydroxide solution at a temperature of 100° C. for 3 hours. The reaction mixture was filtered, and the insoluble matter was removed and added to 500 ml of water. The insoluble matter in water was scarcely dissolved even by the neutralization with 6N hydrochloric acid and a light yellow elastic gel was obtained from it. After de-salting the gel, it was freeze-dried to be a powdery product light yellow in colour in an amount of 8.5 g.

Although the above-mentioned reaction product was immersed into each 500 ml of 10wt% aqueous sodium chloride solution and of 5wt% aqueous acetic acid solution, respectively for 24 hours at room temperature, no dissolution of the product was observed, and since a purple colour developed when the product was made to react with iodine in the presence of sulfuric acid, it was confirmed that de-acetylation has taken place. The degree of de-acetylation was found to be 0.9 according to the values of its elementary analysis. Furthermore, amine group and carboxyl group were confirmed in the product from its infrared absorption spectrum.

The cation exchange capability and the anion exchange capability of the product were respectively 3.8 and 5.0 meq./g according to the batch operation. From these results, it was confirmed that the product was crosslinked carboxymethylchitosan having an amphoteric ion exchangeability.

EXAMPLE 2

The same reaction as in (1) of Example 1 was carried out except for using 20 g of 2,3-dibromopropanol instead of epichlorhydrin and ethanol instead of isopropyl alcohol. As a result, 26 g of elastic and transparent gel was obtained. Its degree of crosslinking was 0.1, and its degree of substitution with carboxymethyl group was 0.7.

The reaction product did not dissolve in any of an aqueous 2N sodium hydroxide solution and an aqueous 10% by weight sodium carbonate solution. Its cation exchange capability obtained by batch operation was 3.1 meq./g.

In the next place, after treating 10 g of the above-mentioned product in 100 g of an aqueous 14N sodium hydroxide solution at a temperature of 100° C. for one hour, the same procedure as in (2) of Example 1 was carried out on the treated product.

The thus obtained product of a yield of 8.0 g was light yellow elastic gel showing infrared absorption bands of 1680, 1500, 1210 and 1190 cm$^{-1}$ and it did not dissolve in the above-mentioned aqueous solutions of acid, alkali and neutral salt, respectively. Its degree of de-acetylation was found to be 0.9.

The cation exchange capability and the anion exchange capability of the product were 3.8 and 4.8 meq./g, respectively. From these results, it was confirmed that the product was a novel crosslinked polymeric substance having an amphoteric ion exchangeability.

EXAMPLE 3

Two similar reactions to that in (1) of Example 1 were carried out, regenerated natural chitin instead of natural chitin, using 33 g of beta-chloropropionic acid and 37 g of gamma-chlorobutyric acid, respectively instead of 30 g of chloroacetic acid, obtaining two reaction products, respectively. They were elastic and transparent gels.

Each ten grams of the two reaction products were subjected to de-acetylation by treating in 100 g of an aqueous 14N sodium hydroxide solution at a temperature of 100° C. for one hour. After the reaction was over, de-salting and freeze-drying were carried on the reaction mixture to obtain a powdery product light yellow in colour.

The thus obtained product did not dissolve in any of an aqueous 2N sodium hydroxide solution, hydrochloric acid and an aqueous sodium carbonate solution. The results of analysis of these products are shown in Table 1. As is seen in Table 1, the products were confirmed to have an amphoteric ion exchangeability.

TABLE 1
Properties of Carboxyalkylated Products

| Properties | Agent for carboxyalkylation | |
|---|---|---|
| | beta-chloropropionic acid | gamma-chlorobutyric acid |
| Yield (g) | 8.3 | 8.1 |
| Degree of crosslinking | 0.1 | 0.1 |
| Degree of substitution with carboxyalkyl | 0.6 | 0.5 |
| Degree of de-acetylation | 0.9 | 0.9 |
| Characteristic infrared absorption bands | | |
| 1680 cm$^{-1}$ | yes | yes |
| 1500 cm$^{-1}$ | yes | yes |
| 1210 cm$^{-1}$ | yes | yes |
| 1190 cm$^{-1}$ | yes | yes |
| Cation exchange capacity (meq./g) | 3.5 | 3.2 |
| Anion exchange capacity (meq./g) | 4.9 | 4.8 |

EXAMPLE 4

Adsorption capacity of the crosslinked polymeric substance of the present invention obtained in Example 1 was examined to saccharic substance such as glucose, fructose and dextran (of molecular weight of 10,000), and to proteins such as bovine serum albumin and gamma-globulin (Fraction II) using distilled water and a phosphate buffer solution of pH of 7.4 as the solvent.

In examination, each 50 ml of a saccharic substance solution (concentration of 500 ppm) and of a protein solution (concentration of 200 ppm) was placed in a 100 ml-erlenmyer flask, and a predetermined amount of the specimen (the crosslinked polymeric substance of the present invention) dissolved in the solvent was added to the flask and then, after 6 hour-shaking at room temperature the infrared absorption and the ultraviolet absorption of the mixture were determined.

Adsorption of saccharic substance was determined on one gram of the specimen (concentration of 20,000 ppm) and adsorption of proteins was determined on 0.05 g of the specimen (concentration of 1,000 ppm).

The results were:
(1) The crosslinked polymer did not adsorb any sugars; and
(2) the crosslinked polymer showed an adsorption capacity of 17 mg/g to albumin and gamma-globulin in the case of distilled water, and 9.4 and 58.4 mg/g to albumin and gamma-globulin, respectively, in the case of the phosphate buffer solution.

As is clearly seen from the above-mentioned results, by using the crosslinked polymeric substance of the present invention it is possible to separate sugars from proteins, and further, by changing the ionic strength of the solvent, it is possible to separate albumin from gamma-globulin.

EXAMPLE 5

After dispersing the crosslinked polymeric substance of the present invention obtained in Example 1 into an aqueous 2wt% sodium chloride solution, the dispersion was poured into a column of 10 mm in inner diameter and 200 mm in height to make a filled column, and then the column was washed with purified water by ion-exchange resin until sodium chloride became not detected in the washings.

In the next place, one ml of an aqueous solution of bovine serum albumin obtained by dissolving 1 mg of the albumin into 10 ml of distilled water was poured onto the column and then the column was developed with distilled water at a rate of 1 ml/min, however, no albumin was detected in the effluent. Thereupon, the development was carried out by an aqueous 0.1N sodium chloride solution at the same conditions as above. In this case, albumin was detected in the effluent.

Accordingly, it was found that the albumin adsorbed onto the crosslinked polymeric substance of the present invention was easily desorbable with an aqueous solution of a neutral salt.

EXAMPLE 6

By the same technique as in Example 5, a Column A was prepared to contain the particles of the crosslinked polymeric substance of the present invention, prepared in Example 1.

For comparison, an amphoteric ion exchange resin, AG 11A8 (manufactured by Bio-Rad Company) was filled in another column of the same dimension by the same technique as in Example 5, and after treatment of de-salting, Column B was prepared.

As the test solution, one milligram of bovine serum fibrinogen and one milligram of bovine serum albumin were dissolved into 10 ml of an aqueous 0.1N sodium chloride solution.

After pouring the test solution into each column of Columns A and B in an amount of one milliliter, the columns were developed with an aqueous 0.1N sodium chloride solution at a rate of one ml/min.

As a result:
(1) In Column A (filled with the crosslinked polymeric substance of the present invention), the mutual separation of fibrinogen and albumin was confirmed; while,
(2) in Column B (filled with AG 11A8), it was impossible to separate fibrinogen and albumin.

EXAMPLE 7

A uniform solution was obtained by dissolving 2 g of chitin into 200 g of formic acid of purity of 99% at a temperature of 10° C., and the solution was de-foamed, and after pouring the solution onto a glass plate provided with frames, the glass plate with the solution was immersed into an ethanol bath to substitute the solvent and then it was washed with running water for 24 hours to obtain a film of chitin.

After removing free water from the film by centrifugation, the film was immersed into an aqueous 40wt% sodium hydroxide solution, and after 3 times of exchanging the sodium hydroxide solution the film was subjected to crosslinking, carboxymethylating and de-acetylating successively as in Example 1. The elementary analytical data of the thus treated film were: 49.0wt% of carbon, 6.3wt% of hydrogen, 7.3wt% of nitrogen and the balance of oxygen. The above-mentioned data and the infrared spectroscopical analysis of the film confirmed that the film is a formed body comprising the crosslinked polymeric substance of the present invention having a degree of carboxymethylation of 0.7, a degree of de-acetylation of 0.9 and a degree of crosslinking of 0.1.

What is claimed is:

1. A method of separating a saccharide-protein or protein-protein substance from an aqueous mixture which comprises passing said aqueous mixture containing said saccharide-protein or protein-protein over a crosslinked derivative of chitin prepared by the process comprising
   (a) crosslinking natural chitin or regenerated chitin with a crosslinking agent selected from the group consisting of compounds represented by the formula,

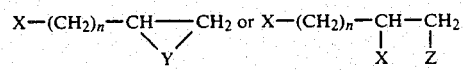

wherein
   X is an atom of chlorine of bromine;
   Y is an atom of oxygen or sulfur;
   Z is a hydroxyl- or thiol group; and
   n is an integer of 1, 2 or 3;
   (b) carboxylating the thus crosslinked chitin or crosslinked regenerated chitin with an etherifying agent selected from halogenocarboxylic acids represented by the formula, $X-(CH_2)_n-COOH$,
   wherein
   X is an atom of chlorine or bromine and
   n is an integer of 1, 2 or 3; and,
   (c) de-acetylating the thus carboxylated crosslinked chitin with an aqueous 4 to 15N alkali solution at a temperature of 65° to 150° C. for 0.1 to 48 hours to obtain said crosslinked derivative of chitin of a degree of crosslinking of 0.01 to 0.3, a degree of carboxyalkylation of 0.1 to 0.9 and a degree of de-acetylation of 0.1 to 1.0 per N-acetylglucosamine unit,
   whereby said saccharide-protein or protein-protein substance adheres to said crosslinked derivative.

2. The method of claim 1, wherein said crosslinking agent is selected from the group consisting of epichlorhydrin, 1-bromo-3,4-epoxybutane, 1-bromo-4,5-epoxypentane, 1-chloro-2,3-epithiopropane, 1-bromo-2,3-epithiopropane, 1-bromo-3,4-epithiobutane, 1-bromo-4,5-epithiopentane, 2,3-dibromopropanol, 2,4-dibromobutanol, 2,5-dibromopentanol, 2,3-dibromopropanethiol, 2,4-dibromobutanethiol and 2,5-dibromopentanethiol.

3. The method of claim 1, wherein crosslinked derivative of chitin has a degree of crosslinking of 0.01 to 0.3, a degree of carboxyalkylating substitution of 0.1 to 0.9, a degree of deacetylation of 0.1 to 1, nitrogen content of 5.3 to 8.3% by weight, an infrared absorption bands of 1680 to 1720 cm$^{-1}$ and 1500 to 1530 cm$^{-1}$, and colour reaction showing purple colour in reaction with iodine in the presence of sulfuric acid, and is insoluble in aqueous acid solutions, aqueous alkali solutions and aqueous salt solutions.

4. A process for preparing a crosslinked derivative of chitin comprising,
   crosslinking chitin or regenerated chitin by a crosslinking agent selected from the group consisting of compounds repesented by the general formula:

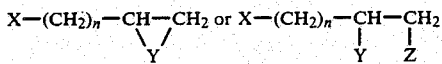

wherein
X is an atom of chlorine or bromine;
Y is an atom of oxygen or sulfur;
Z is a hydroxyl- or a thiol group and
n is an integer of 1, 2 or 3,
carboxylating the thus crosslinked chitin or crosslinked regenerated chitin with an etherifying agent selected halogenocarboxylic acids represented by the formula, X—(CH$_2$)$_n$—COOH wherein X represents an atom of chlorine or bromine and
n is an integer of 1, 2 or 3, and
de-acetylating the thus carboxylated crosslinked chitin with an aqueous 4 to 15N alkali solution at a temperature of 65° to 150° C. for 0.1 to 48 hours to obtain said crosslinked derivative of chitin of a degree of crosslinking of 0.01 to 0.3, a degree of carboxylation of 0.1 to 0.9 and a degree of de-acetylation of 0.1 to 1.0 per N-acetylglucosamine unit.

* * * * *